(12) United States Patent
Jiang et al.

(10) Patent No.: US 12,308,760 B2
(45) Date of Patent: May 20, 2025

(54) MODULAR MULTILEVEL CONVERTER AND CONTROL METHOD THEREOF, AND UNINTERRUPTIBLE POWER SUPPLY

(71) Applicant: Huawei Digital Power Technologies Co., Ltd., Shenzhen (CN)

(72) Inventors: Zhengdong Jiang, Dongguan (CN); Chuntao Zhang, Dongguan (CN); Maoyong Lu, Shenzhen (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 81 days.

(21) Appl. No.: 18/325,638

(22) Filed: May 30, 2023

(65) Prior Publication Data
US 2023/0327575 A1    Oct. 12, 2023

Related U.S. Application Data

(63) Continuation of application No. PCT/CN2020/132684, filed on Nov. 30, 2020.

(51) Int. Cl.
*H02M 7/483*   (2007.01)
*H02M 1/32*    (2007.01)

(52) U.S. Cl.
CPC ......... *H02M 7/4835* (2021.05); *H02M 1/325* (2021.05); *H02M 7/4833* (2021.05); *H02M 7/483* (2013.01)

(58) Field of Classification Search
CPC ... H02M 7/483; H02M 7/4833; H02M 7/4835
See application file for complete search history.

(56) References Cited

U.S. PATENT DOCUMENTS

| | | | | |
|---|---|---|---|---|
| 10,044,294 B2* | 8/2018 | Park | ................. | H02M 7/483 |
| 2011/0278953 A1* | 11/2011 | Zhang | ................. | H02M 7/538 |
| | | | | 307/115 |
| 2013/0044017 A1* | 2/2013 | Matsuzawa | .......... | H03M 1/165 |
| | | | | 330/254 |

FOREIGN PATENT DOCUMENTS

| | | | | |
|---|---|---|---|---|
| CN | 102832841 A | | 12/2012 | |
| CN | 104753136 A | | 7/2015 | |
| CN | 106100397 A | * | 11/2016 | ............ H02M 7/219 |
| CN | 107070249 A | | 8/2017 | |
| CN | 110138011 A | | 8/2019 | |
| JP | 2015035902 A | | 2/2015 | |

* cited by examiner

*Primary Examiner* — Gary A Nash
(74) *Attorney, Agent, or Firm* — Conley Rose, P.C.

(57) ABSTRACT

A modular multilevel converter (MMC) includes an input conversion module, an output conversion module, a common conversion module, and a common bridge arm. One end of the input conversion module is connected to Vin, the other end of the input conversion module is connected to the common conversion module through the common bridge arm, and the common conversion module is connected to Vin and Vout. One end of the output conversion module is connected to the common conversion module through the common bridge arm, and the other end of the output conversion module is connected to Vout. The input conversion module and the output conversion module share one bus capacitor.

20 Claims, 8 Drawing Sheets

MODULAR MULTILEVEL CONVERTER AND CONTROL METHOD THEREOF, AND UNINTERRUPTIBLE POWER SUPPLY

CROSS-REFERENCE TO RELATED APPLICATION

This is a continuation of International Patent Application No. PCT/CN2020/132684 filed on Nov. 30, 2020, the disclosure of which is hereby incorporated by reference in its entirety.

TECHNICAL FIELD

This application relates to the field of electronic power, and in particular, to a modular multilevel converter and a control method thereof, and an uninterruptible power supply.

BACKGROUND

An uninterruptible power supply (UPS) is a device that takes over power supply from a mains supply when the mains supply fails. The UPS is equipped with an energy storage module that continues to supply power when the mains supply is abnormal or disconnected, to ensure safety and reliability of power supply and prevents losses caused by an abnormal mains supply to users. A modular multilevel converter (MMC) is a power conversion unit for alternating current/direct current conversion and direct current/alternating current conversion in the UPS. In terms of topology, the MMC adopts a cascading and modular structure, so that a multilevel step voltage can be obtained without directly connecting power devices in series, dU/dt is low, and voltage harmonic content is low. Therefore, the MMC has a broad application prospect in medium/high-voltage large-capacity systems.

As shown in FIG. 1, the MMC includes an input conversion module, an output conversion module, and a common conversion module. The input conversion module and the common conversion module form a rectifier loop of the MMC, the output conversion module and the common conversion module form an inverter loop of the MMC, and power-frequency currents of the rectifier loop and the inverter loop are canceled at the common conversion module. A volume of a circuit structure of the MMC is reduced by sharing the conversion module, and power consumption of devices in the circuit structure of the MMC is reduced. However, in the circuit structure of the MMC shown in FIG. 1, the input conversion module and the common conversion module are simply connected in series to form the rectifier loop, and the output conversion module and the common conversion module are simply connected in series to form the inverter loop. Therefore, stability of an output voltage of each conversion module in the MMC cannot be ensured. Consequently, an output voltage of the MMC is unstable, and applicability is low.

SUMMARY

This application provides a modular multilevel converter and a control method thereof, and an uninterruptible power supply, so that voltages of conversion modules in the modular multilevel converter can be balanced, properness and stability of an output voltage of the modular multilevel converter can be improved, stability of a circuit of the modular multilevel converter can be improved, and applicability is high.

According to a first aspect, this application provides a modular multilevel converter, where the modular multilevel converter MMC includes an input conversion module, an output conversion module, a common conversion module, and a common bridge arm. A first input/output end of the input conversion module is connected to a first input/output end of a voltage input end Vin of the MMC, and a second input/output end of the input conversion module is connected to a first input/output end of the common conversion module through an input/output end of the common bridge arm. A second input/output end of the common conversion module is connected to a second input/output end of Vin and a first input/output end of a voltage output end Vout of the MMC. A first input/output end of the output conversion module is connected to the first input/output end of the common conversion module through the input/output end of the common bridge arm, and a second input/output end of the output conversion module is connected to a second input/output end of Vout. In this application, the input conversion module, the common bridge arm, and the common conversion module form a rectifier loop (namely, an input loop) of the MMC, the input conversion module is configured to adjust a voltage variation of an output voltage of the rectifier loop, and the common conversion module is configured to adjust an initial voltage of the output voltage of the rectifier loop in the rectifier loop. The output conversion module, the common bridge arm, and the common conversion module form an inverter loop (namely, an output loop) of the MMC, the output conversion module is configured to adjust a voltage variation of an output voltage of the inverter loop, and the common conversion module is configured to adjust an initial voltage of the output voltage of the inverter loop in the inverter loop. In this application, the rectifier loop and the inverter loop of the MMC are shared by devices such as the common conversion module and the common bridge arm, so that a quantity of circuit devices in the circuit structure of the MMC is reduced, thereby reducing a volume of the circuit structure of the MMC, reducing power consumption of the devices in the circuit structure of the MMC, and improving applicability of the MMC. In the MMC provided in this application, the input conversion module and the output conversion module share one bus capacitor. The common conversion module includes at least one multilevel unit connected in series, and one multilevel unit includes one bus capacitor. The MMC provided in this application further includes a balanced circuit module. The balanced circuit module includes a plurality of direct current to direct current (DC/DC) converters, one ends of the plurality of DC/DC converters are connected in parallel, and the other end of one of the plurality of DC/DC converters is connected in parallel to a bus capacitor in the MMC. In this application, the balanced circuit module is configured to adjust, by using the DC/DC converter connected to each bus capacitor, a voltage between both ends of each bus capacitor to a target voltage. This ensures that output voltages of the bus capacitors are balanced, and also ensures that an output voltage of the MMC is proper and stable. Operations are flexible, and applicability is higher.

With reference to the first aspect, in a first possible implementation, one DC/DC converter in the balanced circuit module is connected in parallel to one bus capacitor in the MMC through one voltage step-up unit. The voltage step-up unit includes a first switching transistor, a second switching transistor, and an inductor, the first switching transistor and the second switching transistor are connected in series and then connected in parallel to both ends of the bus capacitor, and a series connection point between the first switching transistor and the second switching transistor is connected to the DC/DC converter through the inductor. In this application, each DC/DC converter in the balanced circuit module can better adjust the voltage between both ends of each bus capacitor in the MMC by using the voltage step-up unit. A structure is simple, and applicability is high.

With reference to the first possible implementation of the first aspect, in a second possible implementation, the balanced circuit further includes a battery unit, and one ends of the plurality of DC/DC converters are connected in parallel to both ends of the battery unit.

With reference to the second possible implementation of the first aspect, in a third possible implementation, the DC/DC converter is a bidirectional DC/DC converter, and a circuit topology of the bidirectional DC/DC converter is an isolated circuit topology.

In this application, each DC/DC converter in the balanced circuit module charges the battery unit based on the voltage between both ends of each bus capacitor, or may charge each bus capacitor by using the battery unit, so that the voltage between both ends of each bus capacitor in the MMC can be better adjusted. A structure is simple, and applicability is high.

With reference to any one of the first aspect to the third possible implementation of the first aspect, in a fourth possible implementation, the MMC further includes a switch apparatus, and the first input/output end of the input conversion module is connected to the first input/output end of Vin through the switch apparatus. In this application, the switch apparatus may be configured to: when an input voltage of Vin suddenly changes or is abnormal, ensure single-phase flow of a current in the MMC, ensure stability of a circuit of the MMC, and improve applicability of the MMC.

With reference to any one of the first aspect to the fourth possible implementation of the first aspect, in a fifth possible implementation, the MMC includes power switching transistors T1, T2, T3, T4, T5, T6, and a bus capacitor C, where T1, T2, and the bus capacitor C form an input conversion module, T5, T6, and the bus capacitor C form an output conversion module, and T3 and T4 form a common bridge arm. A first connection end of T1 is connected to a second connection end of T2, and a connection end therebetween is used as a first input/output end of the input conversion module. A first connection end of T3 is connected to a second connection end of T4, and a connection end therebetween is used as an input/output end of the common bridge arm. A first connection end of T5 is connected to a second connection end of T6, and a connection end therebetween is used as a second input/output end of the output conversion module. A second connection end of T1 is connected to a positive electrode of the bus capacitor C, a second connection end of T3, and a second connection end of T5, and a first connection end of T2 is connected to a negative electrode of C, a first connection end of T4, and the second connection end of T6. In this application, both the input conversion module and the output conversion module are half-bridge modules. The input conversion module and the output conversion module are shared by the common bridge arms T3 and T4, so that a quantity of circuit devices in a circuit structure of the MMC can be reduced. Operations are simple, and applicability is high.

With reference to any one of the first aspect to the fourth possible implementation of the first aspect, in a sixth possible implementation, the multilevel unit is a full-bridge module, and the full-bridge module includes power switching transistors T1', T2', T3', and T4', and a bus capacitor C'. A first connection end of T1' is connected to a second connection end of T2', and a connection end therebetween is used as a first input/output end of the full-bridge module. A first connection end of T3' is connected to a second connection end of T4', and a connection end therebetween is used as a second input/output end of the full-bridge module. A second connection end of T1' is connected to a positive electrode of C' and a second connection end of T3'. A first connection end of T2' is connected to a negative electrode of C' and a first connection end of T4'. In this application, if T1', T2', T3', and T4' are insulated gate bipolar transistors (IGBTs), the first connection ends of T1', T2', T3', and T4' may be emitters of T1', T2', T3', and T4', and the second connection ends of T1', T2', T3', and T4' may be collectors of T1', T2', T3', and T4'. If T1', T2', T3', and T4' are metal-oxide semiconductor field effect transistors MOSFETs, the first connection ends of T1', T2', T3', and T4' may be source electrodes of T1', T2', T3', and T4', and the second connection ends of T1', T2', T3', and T4' may be drain electrodes of T1', T2', T3', and T4'. That is, the first connection ends and the second connection ends of T1', T2', T3', and T4' may be determined based on a specific device type. In this application, the first connection end and the second connection end of each power switching transistor in each functional module (including the input conversion module, the output conversion module, and the common conversion module) may also be determined based on a device type of the power switching transistor. In this application, control flexibility of the bus capacitor in each multilevel unit can be improved by using the full-bridge module, and operations are simple and applicability is high.

According to a second aspect, this application provides a control method for a modular multilevel converter. The method is applicable to the modular multilevel converter MMC provided in any one of the first aspect to the sixth possible implementation of the first aspect. In the method, a voltage between both ends of each bus capacitor in the MMC may be detected; and each switching transistor in a DC/DC converter connected to each bus capacitor is controlled, based on the voltage between both ends of each bus capacitor and a target voltage of each bus capacitor, to turn on or off, to adjust the voltage between both ends of each bus capacitor to the target voltage by using the DC/DC converter connected to each bus capacitor. In this application, each switching transistor in the DC/DC converter connected to the bus capacitors is controlled to turn on or off, to adjust the voltage between both ends of the bus capacitors in the MMC. This ensures that output voltages of the bus capacitors are balanced, and also ensures that an output voltage of the MMC is proper and stable. Operations are flexible, and applicability is higher.

With reference to the second aspect, in a first possible implementation, that each switching transistor in a DC/DC converter connected to each bus capacitor is controlled, based on the voltage between both ends of each bus capacitor and a target voltage of each bus capacitor, to turn on or off includes: when a voltage between both ends of any bus capacitor in the MMC is less than a target voltage of the any bus capacitor, and a voltage between both ends of at least one another bus capacitor other than the any bus capacitor in the MMC is greater than a target voltage of the another bus capacitor, controlling switching transistors in DC/DC converters that are connected to the any bus capacitor and the another bus capacitor to turn on or off, so that the another bus capacitor charges the any bus capacitor; or when a voltage between both ends of any bus capacitor in the MMC is greater than a target voltage of the any bus capacitor, and a voltage between both ends of at least one another bus capacitor other than the any bus capacitor in the MMC is less than a target voltage of the another bus capacitor, controlling switching transistors in DC/DC converters that are connected to the any bus capacitor and the another bus capacitor to turn on or off, so that the any bus capacitor discharges to the another bus capacitor.

In this application, the voltage between both ends of each bus capacitor can be complemented by using the DC/DC converter connected to each bus capacitor in the MMC, so that the voltages between both ends of the bus capacitors in the MMC can be balanced. Operations are simple, and applicability is high.

With reference to the second aspect, in a second possible implementation, a balanced circuit of the MMC converter includes a battery unit, and one ends of a plurality of DC/DC converters are connected in parallel to both ends of the battery unit; and that each switching transistor in a DC/DC converter connected to each bus capacitor is controlled, based on the voltage between both ends of each bus capacitor and a target voltage of each bus capacitor, to turn on or off includes: when a voltage between both ends of any bus capacitor in the MMC is less than a target voltage of the any bus capacitor, controlling switching transistors in a DC/DC converter connected to the any bus capacitor to turn on or off, so that the battery unit charges the any bus capacitor; or when a voltage between both ends of any bus capacitor in the MMC is greater than a target voltage of the any bus capacitor, controlling switching transistors in a DC/DC converter connected to the any bus capacitor to turn on or off, so that the any bus capacitor discharges to the battery unit.

In this application, each DC/DC converter connected to each bus capacitor in the MMC may charge the battery unit based on the voltage between both ends of each bus capacitor, and the battery unit may charge each bus capacitor, so that the voltage between both ends of the bus capacitor in the MMC can be better adjusted. A structure is simple, and applicability is high.

With reference to any one of the second aspect to the second possible implementation of the second aspect, in a third possible implementation, an input conversion module and an output conversion module share a first bus capacitor, and before any bus capacitor of any multilevel unit in the common conversion module is connected, the method further includes: detecting a voltage between both ends of the first bus capacitor and a voltage between both ends of each bus capacitor in the multilevel unit; and connecting the any bus capacitor at a moment ti when an input voltage of Vin and an output voltage of Vout are greater than or equal to a sum of voltages between both ends of the bus capacitors in the common conversion module, where the sum of the voltages between both ends of the bus capacitors in the common conversion module is a sum of voltages between both ends of bus capacitors that are connected to the common conversion module and the voltage between both ends of the any bus capacitor.

In this application, when the any bus capacitor in the common conversion module of the MMC is connected, an occasion for connecting the bus capacitor may be controlled based on the input voltage and the output voltage of the MMC and the voltages between both ends of the bus capacitors that are connected to the MMC. This can prevent a current of an input loop in the MMC from flowing back to a mains supply, and can ensure properness of the output voltage of the MMC, so as to prevent a sudden change of the input voltage, improve stability of a circuit of the MMC, and improve applicability.

According to a third aspect, this application provides a control method for a modular multilevel converter, where the method is applicable to a modular multilevel converter MMC. The MMC includes an input conversion module, an output conversion module, a common conversion module, and a common bridge arm. A first input/output end of the input conversion module is connected to a first input/output end of a voltage input end Vin of the MMC, and a second input/output end of the input conversion module is connected to a first input/output end of the common conversion module through an input/output end of the common bridge arm. A second input/output end of the common conversion module is connected to a second input/output end of Vin and a first input/output end of a voltage output end Vout of the MMC. A first input/output end of the output conversion module is connected to the first input/output end of the common conversion module through the input/output end of the common bridge arm, and a second input/output end of the output conversion module is connected to a second input/output end of Vout. In the MMC, the input conversion module and the output conversion module share a first bus capacitor, the common conversion module includes at least one multilevel unit connected in series, and one multilevel unit includes one bus capacitor. In the method, the first bus capacitor may be first connected, and the bus capacitor of each multilevel unit in the common conversion module may be bypassed. Before any bus capacitor of any multilevel unit in the common conversion module is connected, a voltage between both ends of the first bus capacitor and a voltage between both ends of each bus capacitor in the common conversion module may be detected, and the any bus capacitor is connected at a moment ti when an input voltage of Vin and an output voltage of Vout are greater than or equal to a sum of a voltage between both ends of the bus capacitor in the common conversion module, where the sum of the voltages between both ends of the bus capacitors in the common conversion module is a sum of voltages between both ends of bus capacitors that are connected to the common conversion module and a voltage between both ends of the any bus capacitor.

In this application, when the any bus capacitor in the common conversion module of the MMC is connected, an occasion for connecting the bus capacitor may be controlled based on the input voltage and the output voltage of the MMC and the voltages between both ends of the bus capacitors that are connected to the MMC. This can prevent a current of an input loop in the MMC from flowing back to a mains supply, and can ensure properness of the output voltage of the MMC, so as to prevent a sudden change of the input voltage, improve stability of a circuit of the MMC, and improve applicability.

According to a fourth aspect, this application provides an uninterruptible power supply. The UPS includes a battery, a static transfer switch (STS), and the MMC provided in any one of the first aspect to the sixth possible implementation of the first aspect. The battery is configured to provide an input for the MMC when an input of the main input end Vin of the UPS is abnormal, and supply power to a load through an output of the MMC. The STS is configured to provide a backup power supply channel for the UPS when the output of the MMC is abnormal.

With reference to the first aspect, in a possible implementation, a battery unit in the balanced circuit of the MMC is connected in series to the battery.

In this application, the voltages at both ends of the bus capacitors in the MMC can be balanced by using the balanced circuit module in the MMC, so that circuit stability of the UPS can be improved, and applicability of the UPS can be improved. In addition, in this application, each bus capacitor in the balanced circuit may further charge the battery in the UPS, and no charger is required. Therefore, circuit devices of the UPS can be reduced, and applicability is higher.

DESCRIPTION OF EMBODIMENTS

Figure 1:
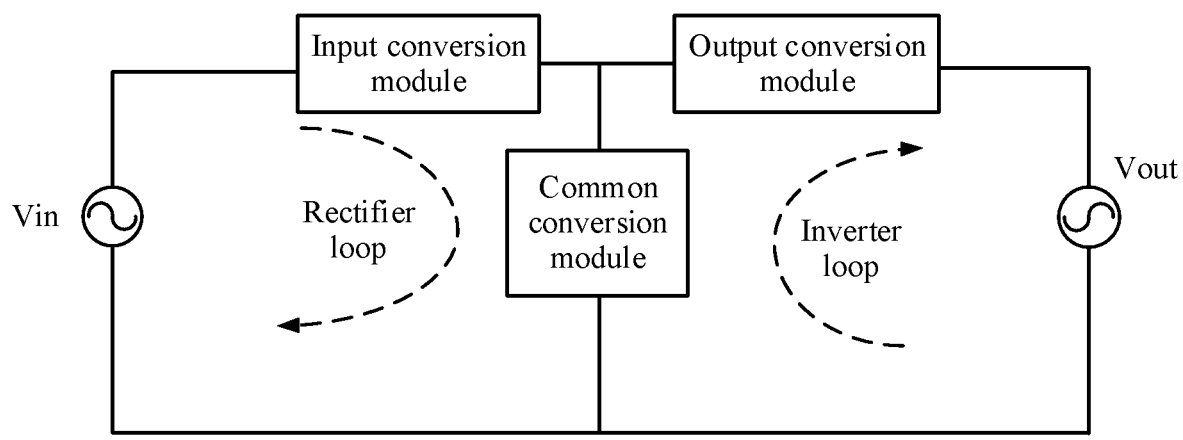
FIG. 1 is a schematic diagram of a structure of an MMC.
Figure 2:
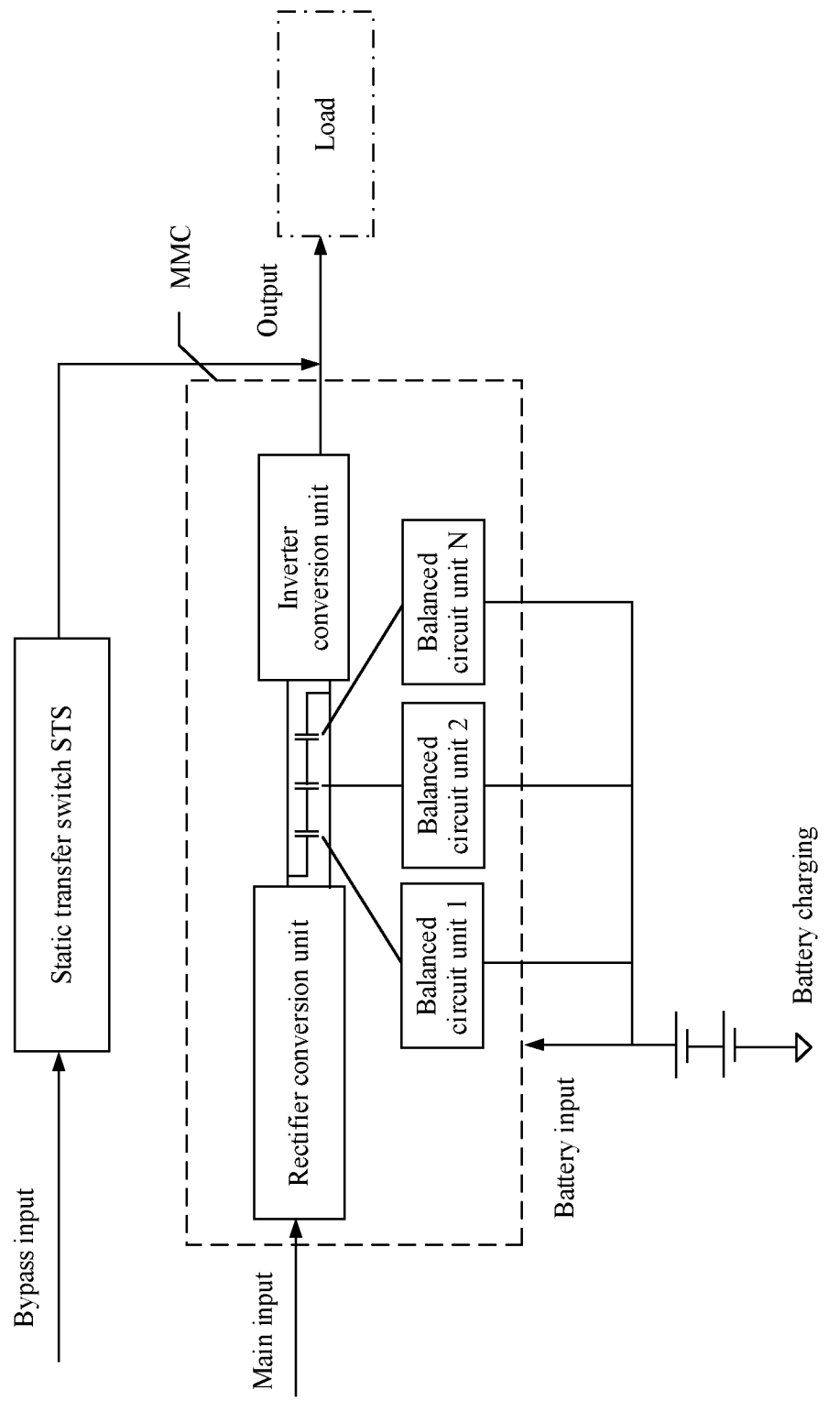
FIG. 2 is a schematic diagram of a structure of a UPS system according to an embodiment of this application.

A modular multilevel converter and a control method thereof that are provided in this application are applicable to a UPS. An MMC provided in this application may be a power conversion unit used for alternating current/direct current conversion and direct current/alternating current conversion in the UPS. In other words, the MMC provided in this application may be a functional module in the UPS. FIG. 2 is a schematic diagram of a structure of a UPS system according to an embodiment of this application. The UPS provided in this application usually includes parts such as a battery, an STS, and an MMC. The MMC includes a rectifier conversion unit, an inverter conversion unit, and a balanced circuit unit. A quantity of balanced circuit units may be determined based on a quantity of bus capacitors shared by the rectifier conversion unit and the inverter conversion unit. For ease of description, a balanced circuit unit 1, a balanced circuit unit 2, . . . , and a balanced circuit unit N may be used as an example for description, where N is an integer greater than or equal to 2. In the UPS shown in FIG. 2, the battery is configured to provide an input for the MMC when an input of a main input end (namely, Vin) of the UPS system is abnormal, and supply power to a load through an output of the MMC. The STS is configured to provide a backup power supply channel for the UPS when the output of the MMC is abnormal, to supply power to the load. The rectifier conversion unit includes modules included in a rectifier loop of the MMC provided in this embodiment of this application. The inverter conversion unit includes modules included in an inverter loop of the MMC provided in this embodiment of this application. The N balanced circuit units may form a balanced circuit module in the MMC. The following describes, with reference to FIG. 3 to FIG. 10, an MMC and a control method thereof provided in this application by using examples.

Figure 3:
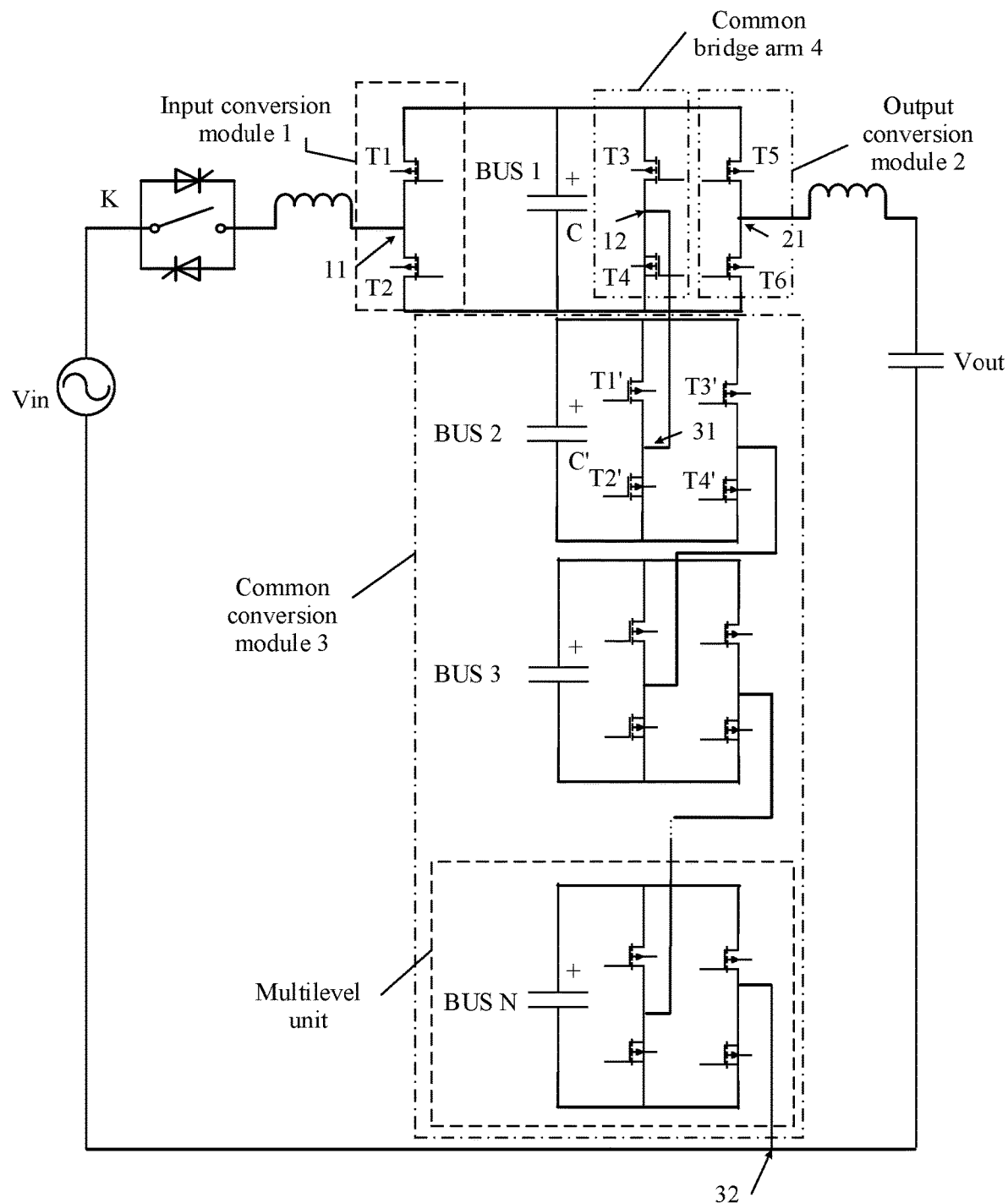
FIG. 3 is a schematic diagram of a structure of an MMC according to an embodiment of this application.

FIG. 3 is a schematic diagram of a structure of an MMC according to an embodiment of this application. The MMC provided in this embodiment of this application may include an input conversion module 1, an output conversion module 2, a common conversion module 3, and a common bridge arm 4 that is shared by the input conversion module and the output conversion module. A first input/output end 11 of the input conversion module 1 is connected to a first input/output end of a voltage input end Vin of the MMC. A second input/output end of the input conversion module 1 is connected to a first input/output end 31 of the common conversion module 3 through an input/output end 12 of the common bridge arm 4. A second input/output end 32 of the common conversion module 3 is connected to a second input/output end of Vin and a first input/output end of a voltage output end Vout of the MMC. A first input/output end of the output conversion module 2 is connected to the first input/output end 31 of the common conversion module 3 through the input/output end 12 of the common bridge arm 4. In other words, the first input/output end of the input conversion module 1 share the common bridge arm 4 with the output conversion module 2, and is connected to the common conversion module 3 through the common bridge arm; and the second input/output end 21 of the output conversion module 2 is connected to a second input/output end of Vout. Herein, Vin is a step sine wave voltage input. When Vin is a positive half-cycle input, the first input/output end of Vin is an output end, and the second input/output end thereof is an input end; the first input/output end of each conversion module is an input end, and the second input/output end thereof is an output end; and the first input/output end of Vout is an input end, and the second input/output end of Vout is an output end. When Vin is a negative half-cycle input, the first input/output end of Vin is an input end, and the second input/output end thereof is an output end; the first input/output end of each conversion module is an output end, and the second input/output end thereof is an input end; and the first input/output end of Vout is an output end, and the second input/output end of Vout is an input end. Details are not described below. For ease of description, an example in which Vin is a positive half-cycle input is used below for description.

In some feasible implementations, the input conversion module 1, the common bridge arm 4, and the common conversion module 3 form a rectifier loop (namely, an input loop) of the MMC; the input conversion module 1 is configured to adjust a voltage variation of an output voltage of the rectifier loop; and the common conversion module 3 is configured to adjust, in the rectifier loop, an initial voltage of the output voltage of the rectifier loop. The output conversion module 2, the common bridge arm 4, and the common conversion module 3 form an inverter loop (namely, an output loop) of the MMC; the output conversion module 2 is configured to adjust a voltage variation of an output voltage of the inverter loop; and the common conversion module 3 is configured to adjust, in the inverter loop, an initial voltage of the output voltage of the inverter loop. In other words, the rectifier loop of the MMC provided in this embodiment of this application includes the input conversion module 1, the common bridge arm 4, and the common conversion module 3, where both the common conversion module 3 and the common bridge arm 4 are common bridge arms shared by the rectifier loop and the inverter loop. The input conversion module 1 is configured to adjust the voltage variation of the output voltage of the rectifier loop; and the common conversion module 3 is configured to adjust the initial voltage of the output voltage of the rectifier loop. The common conversion module 3 is connected to the rectifier loop/inverter loop based on turn-on or turn-off of power switching transistors. When the common conversion module 3 is connected to the rectifier loop, the input conversion module 1 shares a part of a voltage of the rectifier loop, and the common conversion module 3 shares another part of the voltage of the rectifier loop. In the rectifier loop, a current flows clockwise, flows from Vin to the input conversion module 1, flows from the input conversion module 1 to the common conversion module 3, and finally returns to Vin. The inverter loop includes the output conversion module 2 and the common conversion module 3, where the common conversion module 3 is a common bridge arm shared by the inverter loop and the rectifier loop. The output conversion module 2 is configured to adjust the voltage variation of the output voltage of the inverter loop; and the common conversion module 3 is configured to adjust the initial voltage of the output voltage of the inverter loop. When the common conversion module 3 is connected to the inverter loop, the output conversion module 2 shares a part of a voltage of the inverter loop, and the common conversion module 3 shares another part of the voltage of the inverter loop. In the inverter loop, a current flows counterclockwise, and an output current flows from the common conversion module 3 to the output conversion module 2.

In the MMC current provided in this embodiment of this application, the common conversion module 3 is a common bridge arm of the rectifier loop and the inverter loop; and the current of the rectifier loop flows clockwise in the common conversion module 3, the current of the inverter loop flows counterclockwise in the common conversion module 3, and current directions on the common conversion module 3 are opposite to each other, so as to reduce the current on the common conversion module 3, so that power consumption on the common conversion module 3 is reduced or even reduced to be negligible. Therefore, power consumption of the MMC is reduced. In addition, in this embodiment of this application, another conversion module other than the input conversion module in the input loop (namely, the rectifier loop) and another conversion module other than the output conversion module in the output loop (namely, the inverter loop) are integrated into the common conversion module, so that the devices in the circuit structure of the MMC include only one input conversion module, one output conversion module, and one common conversion module. The conversion modules are shared, so that a quantity of conversion modules in the circuit structure of the MMC is reduced, thereby reducing a volume of the circuit structure of the MMC, reducing power consumption of the devices in the circuit structure of the MMC, and improving applicability of the MMC.

In some feasible implementations, as shown in FIG. 3, the MMC includes power switching transistors T1, T2, T3, T4, T5, and T6, and a bus capacitor C shared by the input conversion module 1 and the output conversion module 2. The input conversion module 1 is a half-bridge module including T1, T2, and the bus capacitor C; the output conversion module 2 is a half-bridge module including T5, T6, and the bus capacitor C; and T3 and T4 form the common bridge arm 4. A first connection end of T1 is connected to a second connection end of T2, and a connection end therebetween (for example, 11 in FIG. 3) is used as a first input/output end of the input conversion module; and a second connection end of T1 and a first connection end of T2 are used as a second input/output end of the input conversion module. A first connection end of T5 is connected to a second connection end of T6, and a connection end therebetween (for example, 21 in FIG. 3) is used as a second input/output end of the output conversion module 2; and a second connection end of T5 and a first connection end of T6 are used as a first input/output end of the output conversion module 2. A first connection end of T3 is connected to a second connection end of T4, and a connection end therebetween (for example, 12 in FIG. 3) is used as an input/output end (or referred to as a first input/output end of the common bridge arm) of the common bridge arm 4; a second connection end of T3 is connected to the second connection end of T1, a positive electrode of the bus capacitor C, and the second connection end of T5, and a connection end therebetween is used as an output end of the bus capacitor C; and a first connection end of T4 is connected to the first connection end of T2, a negative electrode of C, and the second connection end of T6, and a connection end therebetween is used as an input end of C. In other words, the input conversion module 1 and the output conversion module 3 may share a group of common bridge arms (namely, the common bridge arm 4), and a series connection point (12 in FIG. 3) of an upper bridge arm (namely, T3) and a lower bridge arm (T4) that are of the common bridge arm may be used as an input/output end of the common bridge arm; and the input conversion module 1 and the output conversion module 3 may further share a bus capacitor (for example, the bus capacitor C, and for ease of description, a first bus capacitor may be used as an example for description), and the bus capacitor C may be used as an energy storage and filtering unit in the input conversion module 1 and an energy storage and filtering unit in the output conversion module 2. When the bus capacitor C is connected to a circuit of the MMC, a voltage between both ends of the bus capacitor C may be represented by BUS 1.

In some feasible implementations, as shown in FIG. 3, in the MMC, the common conversion module 3 includes at least one multilevel unit (for example, M multilevel units) connected in series. In other words, the common conversion module 3 may include one or more multilevel units connected in series. If an input loop of the MMC includes N (N is an integer greater than or equal to 2) conversion modules, (N−1) modules in the N modules included in the input loop other than the input conversion module 1 may be combined into the common conversion module 3, that is, M=N−1. In this case, the common conversion module 3 includes M multilevel units, so that the devices in the circuit structure of the MMC include only one input conversion module, one output conversion module, one common bridge arm, and M multilevel units of the common conversion module. If N is 2, that is, M is equal to 1, the common conversion module 3 is one conversion module. If N is greater than 2, that is, M is greater than 1, the M multilevel units included in the common conversion module 3 are connected in series. A first input/output end of a first multilevel unit in the plurality of multilevel units connected in series is used as a first input/output end 31 of the common conversion module 3; a second input/output end of the first multilevel unit is connected to a first input/output end of a next-level multilevel unit; and a second input/output end of the last multilevel unit is used as a second input/output end 32 of the common conversion module 3. As shown in FIG. 3, a multilevel unit (for example, the first multilevel unit in the common conversion module 3, and for ease of description, the multilevel unit 1 may be used as an example for description) in the common conversion module may include power switching transistors T1', T2', T3', and T4', and a bus capacitor C' (for example, a bus capacitor C1' in the multilevel unit 1). A first connection end of T1' is connected to a second connection end of T2', and a connection end (for example, 31) is used as a first input/output end of the multilevel unit 1; a first connection end of T3' is connected to a second connection end of T4', and a connection end therebetween is used as a second input/output end of the multilevel unit 1; a second connection end of T1' is connected to a positive electrode of C' and a second connection end of T3', and a connection end therebetween is used as an output end of C'; and a first connection end of T2' is connected to a negative electrode of C' and a first connection end of T4', and a connection end therebetween is used as an input end of C'.

Figure 4:
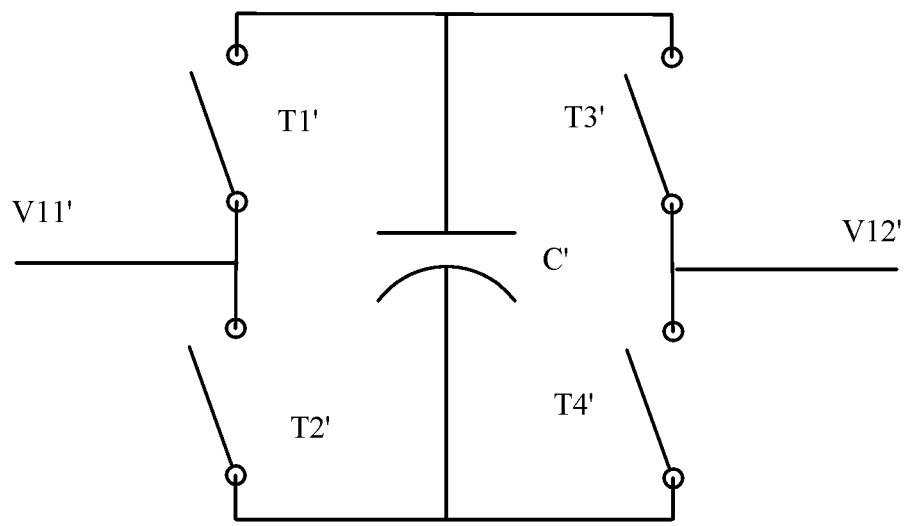
FIG. 4 is a schematic diagram of a structure of a full-bridge module.
Figure 5:
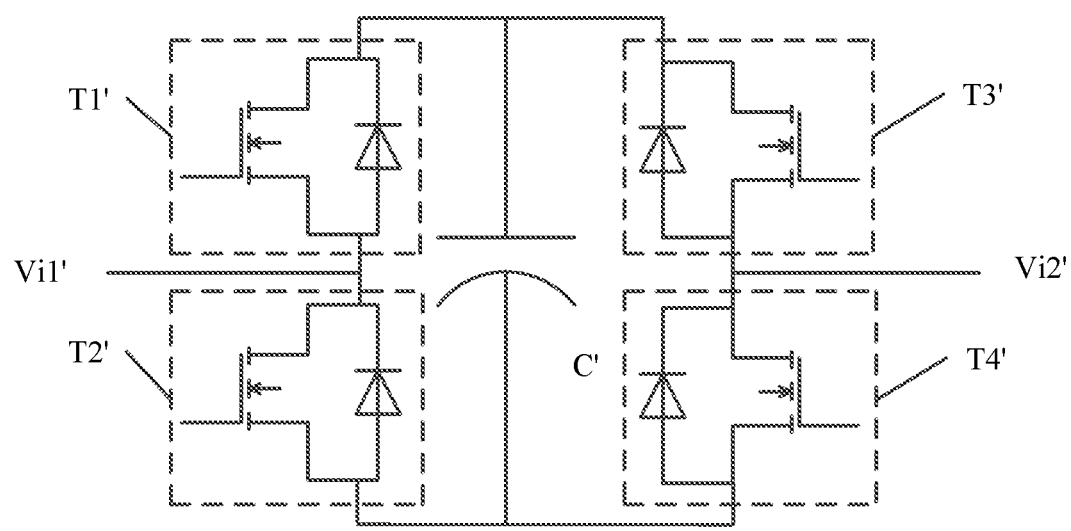
FIG. 5 is another schematic diagram of a structure of a full-bridge module.

In other words, in this embodiment of this application, all multilevel units in the common conversion module 3 shown in FIG. 3 are full-bridge modules. For ease of understanding, the following describes a structure of the full-bridge module by using an example with reference to FIG. 4. FIG. 4 is a schematic diagram of a structure of a full-bridge module. The full-bridge submodule includes four power switching transistors T1', T2', T3', and T4', and a capacitor C'. The capacitor C' is charged or discharged by controlling T1', T2', T3', and T4' to turn on or off. FIG. 5 is another schematic diagram of a structure of a full-bridge module. The full-bridge module may alternatively include four power switching transistors T1', T2', T3', and T4' with anti-parallel connected diodes, and a capacitor C'. A first connection end (for example, an emitter) of T1' is connected to a second connection end (for example, a collector) of T2', and a connection end therebetween is used as a first input/output end Vi1' of the full-bridge module; a first connection end of T3' is connected to a second connection end of T4', and a connection end therebetween is used as a second input/output end Vi2' of the full-bridge module; a second connection end of T1' is connected to a positive electrode of C' and a second connection end of T3', and a connection end therebetween is used as an output end of an energy storage and filtering unit in the full-bridge module; and a first connection end of T2' is connected to a negative electrode of C' and a first connection end of T4', and connection end therebetween is used as an input end of the energy storage and filtering unit in the full-bridge submodule. That is, the full-bridge submodule includes the energy storage and filtering unit, where the energy storage and filtering unit is the capacitor C', the positive electrode of the capacitor C' is the output end of the energy storage and filtering unit, and the negative electrode of the capacitor C' is the input end of the energy storage and filtering unit.

If T1', T2', T3', and T4' are insulated gate bipolar transistors (IGBTs), the first connection ends of T1', T2', T3', and T4' may be emitters of T1', T2', T3', and T4', and the second connection ends of T1', T2', T3', and T4' may be collectors of T1', T2', T3', and T4'. If T1', T2', T3', and T4' are metal-oxide-semiconductor field-effect transistors (MOSFETs), the first connection ends of T1', T2', T3', and T4' may be source electrodes of T1', T2', T3', and T4', the second connection ends of T1', T2', T3', and T4' may be drain electrodes of T1', T2', T3', and T4'. That is, the first connection ends and the second connection ends of T1', T2', T3', and T4' may be determined based on a specific device type. This is not limited herein. The first connection end and the second connection end of each power switching transistor in the functional modules (including the input conversion module 1, the output conversion module 2, and the common conversion module 3) described in this embodiment of this application may also be determined based on a device type of the power switching transistor. Details are not described below.

The following describes, with reference to FIG. 3 to FIG. 10, operating principles of an MMC and a control method thereof that are provided in embodiments of this application by using examples.

In some feasible implementations, the input voltage of the MMC is a step sine wave voltage. The following uses a positive half-cycle voltage of the sine wave voltage as an example for description, and N=6 is used as an example for description. An input loop of the MMC includes an input conversion module 1, a common bridge arm 4, and a common conversion module 3; and an output loop includes an output conversion module 2, the common bridge arm 4, and the common conversion module 3. In the input loop, the input conversion module 1 and the common conversion module 2 have different functions. Similarly, in the output loop, the output conversion module 2, and the common conversion module 3 have different functions. In the MMC shown in FIG. 3, T3 and T4 in the common bridge arm 4 are switches that turn on alternately. When Vin is a positive half-cycle voltage input, T4 turns on, and T3 turns off; and when Vin is a negative half-cycle voltage input, T3 turns on, and T4 turns off. For ease of description, an example in which T4 turns on and T3 turns off when Vin is a positive half-cycle voltage input is used below for description.

The following uses an example in which the input conversion module or the output conversion module is a "conversion module" and an example in which the common conversion module is a "common module" for description.

Conversion module: A high-frequency variation is generated based on a variation of a high-frequency switch, and an input voltage variation or an output voltage variation is adjusted by controlling a value of a duty cycle. When T2 and T4 turn on, or T6 and T4 turn on, a variation of the input voltage or the output voltage is the smallest (0). When T1 and T4 turn on, or T5 and T4 turn on, the variation of the input voltage or the output voltage is the largest. When T1 and T4 turn on, or T5 and T4 turn on, the variation of the input voltage and the output voltage is a variation of a voltage between both ends of the bus capacitor C, and the largest variation of the input voltage or the output voltage is the voltage between both ends of C, where the voltage between both ends of C may be represented as BUS 1.

Common module: An operating interval of an input/output voltage is determined based on a variation of a low-frequency switch, and an initial voltage of the input/output voltage is adjusted. The smallest value of an initial voltage of the input/output voltage is 0, and the largest value thereof is a sum of voltages between both ends of the bus capacitors in the common module.

Output voltage of the input/output loop=Initial voltage(determined by the common module)+Voltage variation(determined by the conversion module)

Figure 6:
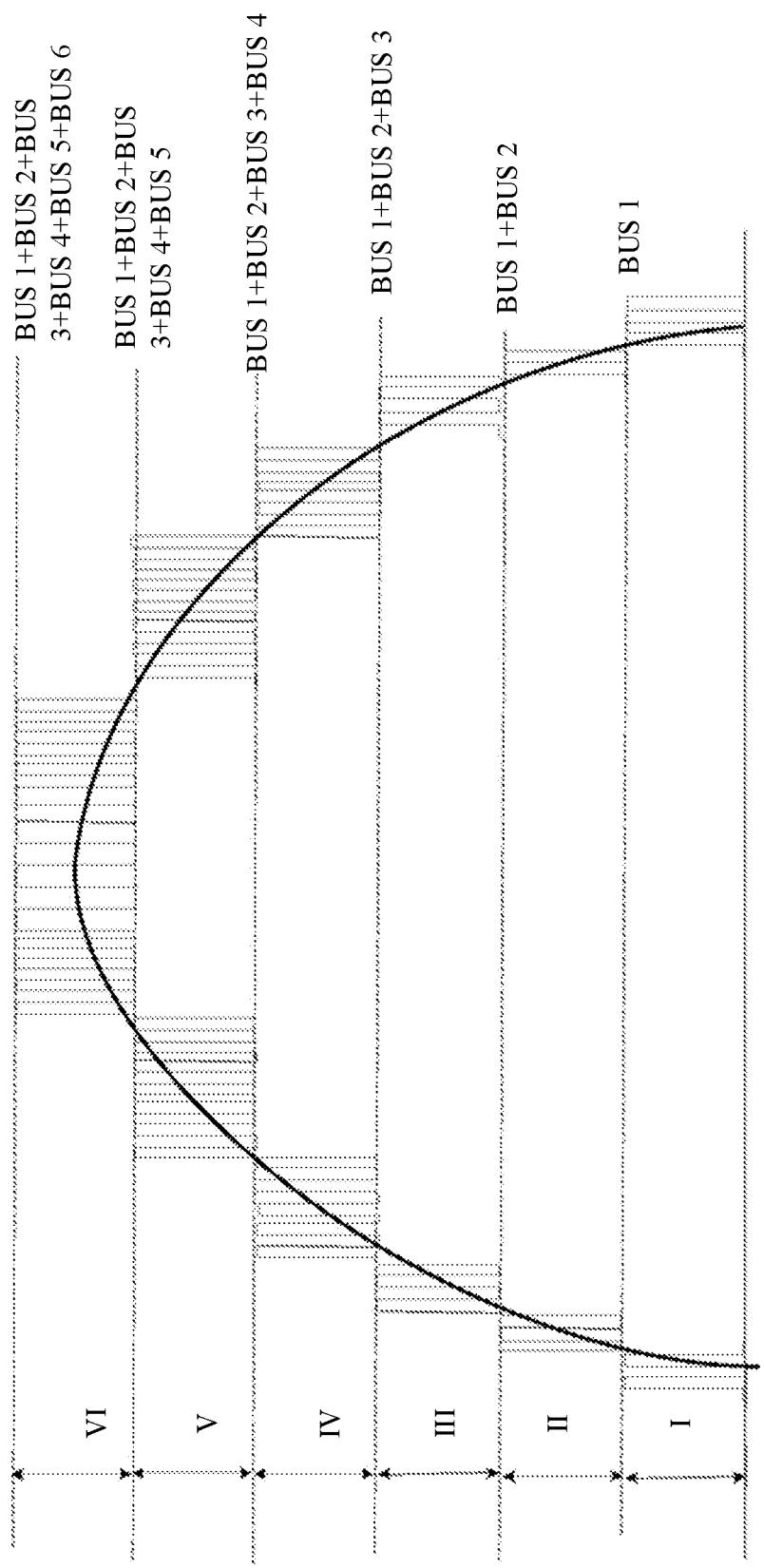
FIG. 6 is a schematic diagram of an output voltage of an MMC according to an embodiment of this application.

FIG. 6 is a schematic diagram of an output voltage of an MMC according to an embodiment of this application. As shown in FIG. 6, assuming that an entire positive half-cycle voltage is divided into six intervals (I-VI), a common module determines that a circuit (namely, a circuit of the MMC) operates in one of the six intervals I-IV, and a conversion module determines a high-frequency variation in the interval. The common module includes N-1 multilevel units, and a quantity of multilevel units (that is, a bus capacitor of the multilevel unit is connected) that are in the N−1 multilevel units and that are connected to an input loop or an output loop determines that the circuit operates in one of the six intervals I to IV.

The following uses interval I and interval VI as an example for description.

Operating interval I. Through control by a switch of the common module, no common bridge arm is connected to the circuit (that is, no multilevel unit in the common module is connected to the circuit, and in this case, bus capacitors of all multilevel units of the common module are in a bypass state), that is, an initial circuit output is 0, and the output voltage of the entire circuit is determined by the conversion module. In this case, an output voltage range of the entire circuit is 0–BUS 1. Because a voltage value in the interval I is the smallest, BUS 1 may meet an output voltage requirement.

Operating interval VI: Through control by a switch of the common module, all common bridge arms (that is, all multilevel units of the common module) are connected to the circuit. That is, the initial circuit output is BUS 2+BUS 3+BUS 4+BUS 5+BUS 6, and 0–BUS 1 of the conversion module is added on this basis. That is, the output voltage of the entire circuit is jointly determined by the common module and the conversion module. In this case, the output range of the circuit is BUS 2+BUS 3+BUS 4+BUS 5+BUS 6−BUS 1+BUS 2+BUS 3+BUS 4+BUS 5+BUS 6. Because the voltage value of the interval IV is the largest, BUS 2+BUS 3+BUS 4+BUS 5+BUS 6−BUS 1+BUS 2+BUS 3+BUS 4+BUS 5+BUS 6 can meet the output voltage requirement.

The operating principles of II-V are the same, which are summarized as follows:

Operating interval I: The initial circuit output is 0, and the output voltage range is 0–BUS 1. Before the bus capacitor C is connected, the output voltage of the circuit is 0. When the bus capacitor C is connected, the output voltage is BUS 1 (that is, the voltage between both ends of the bus capacitor C). In this case, the output voltage range of the MMC may be represented as 0–BUS 1.

Operating interval II: The initial circuit output is BUS 2, and the output voltage range is BUS 2-BUS 1+BUS 2. When the power frequency switching transistor (T5) of the bus capacitor C turns off, and the power frequency switching transistors (T1' and T4') of the bus capacitor (for example, C1; and for ease of description, the following uses an example in which Ci' represents a bus capacitor of an ith multilevel unit in the common module, and BUSi represents a voltage between both ends of Ci' for description, where i is less than or equal to M) of the first multilevel unit in the common module turn on, the output voltage of the MMC is BUS 2. When the power frequency switching transistor (T5) of C turns on, and the power frequency switching transistors (T1' and T4') of C1' turn on, the output voltage of the MMC is BUS 1+BUS 2. For ease of understanding, in this case, the output voltage range of the MMC may be represented as BUS 2−BUS 1+BUS 2.

Operating interval III: The initial circuit output is BUS 2+BUS 3, and the output voltage range is BUS 2+BUS 3−BUS 1+BUS 2+BUS 3. When the power frequency switching transistor (T5) of C turns off, and the power frequency switching transistors (T1' and T4') of C2' and C3' turn on, the output voltage of the MMC is BUS 2+BUS 3. When the power frequency switching transistor (T5) of C turns on, and the power frequency switching transistors (T1' and T4') of C2' and C3' turn on, the output voltage of the MMC is BUS 1+BUS 2+BUS 3. In this case, the output voltage range of the MMC may be represented as BUS 2+BUS 3−BUS 1+BUS 2+BUS 3.

Operating interval IV: The initial circuit output is BUS 2+BUS 3+BUS 4, and the output voltage range is BUS 2+BUS 3+BUS 4−BUS 1+BUS 2+BUS 3+BUS 4. Similarly, in this case, the output voltage range of the MMC may be represented as BUS 2+BUS 3+BUS 4−BUS 1+BUS 2+BUS 3+BUS 4.

Operating interval V: The initial circuit output is BUS 2+BUS 3+BUS 4+BUS 5, and the output voltage range is BUS 2+BUS 3+BUS 4+BUS 5−BUS 1+BUS 2+BUS 3+BUS 4+BUS 5. Similarly, in this case, the output voltage range of the MMC may be represented as BUS 2+BUS 3+BUS 4+BUS 5−BUS 1+BUS 2+BUS 3+BUS 4+BUS 5.

Operating interval VI: The initial circuit output is BUS 2+BUS 3+BUS 4+BUS 5+BUS 6, and the output voltage range is BUS 2+BUS 3+BUS 4+BUS 5+BUS 6−BUS 1+BUS 2+BUS 3+BUS 4+BUS 5+BUS 6. Similarly, in this case, the output voltage range of the MMC may be represented as BUS 2+BUS 3+BUS 4+BUS 5+BUS 6−BUS 1+BUS 2+BUS 3+BUS 4+BUS 5+BUS 6.

An operating principle of the negative half cycle of the voltage is the same as that of the positive half cycle described above, and details are not described herein again.

It should be noted that, in this embodiment of this application, the input loop and the output loop share a common conversion module. A quantity of multilevel units in the common conversion module needs to be determined based on an output voltage requirement of the output loop, and a phase of the input voltage needs to be determined based on the output voltage. Therefore, it needs to be ensured that the voltage of the input loop and the voltage of the output loop are in-phase voltages.

A connection control method of the bus capacitors in the MMC is as follows:

In some feasible implementations, in the circuit structure of the MMC shown in FIG. 3, in the operating interval I, the output voltage range is 0–BUS 1, and when the bus capacitor C is connected and the bus capacitors in the common conversion module are not connected (that is, the bus capacitors are in a bypass state), the bus capacitor C may be charged by turning on a power switching transistor of the input conversion module. When the bus capacitor C1' of the first multilevel unit in the common conversion module is connected (that is, T1' and Ti4' of the multilevel unit 1 turn on, and another multilevel bus capacitor in the common conversion module is in a bypass state), if both T2 and T4 turn on, an input voltage of Vin needs to be greater than or equal to a voltage between both ends of C1', so as to prevent the current from flowing back. That is, when the bus capacitor C1' of the first multilevel unit in the common conversion module is connected (that is, T1' and T4' of the multilevel unit 1 turn on), and both T2 and T4 turn on, if the input voltage of Vin is less than the voltage between both ends of C1', C1' discharges to Vin, and in this case, the current of the input loop flows to Vin, and consequently, the current flows back to the mains supply. Therefore, to prevent the current of the input loop of the MMC from flowing back to the mains supply, before C1' in the common conversion module is connected, a voltage at both ends of the bus capacitor C and a voltage at both ends of each bus capacitor in the common conversion module may be detected, and C1' is connected at a moment (it is assumed that the moment is t1) when the input voltage of Vin is greater than or equal to the voltage between both ends of C1'. Similarly, before any other bus capacitor Ci' in the common conversion module is connected, a voltage between both ends of the bus capacitor C and a voltage between both ends of each bus capacitor in the common conversion module may be detected. The bus capacitor Ci' is connected at a moment ti when the input voltage of Vin is greater than or equal to a sum of the voltage between both ends of the bus capacitor in the common conversion module. Herein, the sum of the voltage between both ends of the bus capacitor in the common conversion module is a sum of voltages between both ends of the bus capacitors that are connected to the common conversion module and the voltage between both ends of the bus capacitor Ci'. For example, before C2' in the common conversion module is connected, the voltage between both ends of the bus capacitor C and the voltage between both ends of each bus capacitor in the common conversion module may be detected, and C2' is connected at a moment (it is assumed that the moment is t2) when the input voltage of Vin is greater than or equal to the sum of the voltages between both ends of C1' and C2'. Before C3' in the common conversion module is connected, the voltage between both ends of the bus capacitor C and the voltage between both ends of each bus capacitor in the common conversion module may be detected, and C3' is connected at a moment (it is assumed that the moment is t3) when the input voltage of Vin is greater than or equal to the sum of the voltages between both ends of C1', C2', and C3', and so on.

In addition, in some feasible implementations, before the bus capacitor C1' is connected, the output loop of the MMC operates in the operating interval I. In the operating interval I, the output voltage range of the MMC may be represented as 0–BUS 1; that is, in the operating interval I, the output voltage range of the MMC may be represented as 0—the voltage between both ends of the bus capacitor C. The bus capacitor C1' is connected, the output loop of the MMC operates in the operating interval II, and the output voltage range of the MMC may be represented as BUS 2–BUS 1+BUS 2. In other words, in the operating interval II, the output voltage range of the MMC may be represented as the voltage at both ends of C1'—a sum of the voltage at both ends of the bus capacitor C and the voltage at both ends of the bus capacitor C1'. It can be learned that, to ensure properness of the output voltage of the MMC (that is, a waveform of the output voltage of the MMC is coherent), when the bus capacitor C1' is connected, the output voltage of the MMC needs to be greater than or equal to the voltage between both ends of the bus capacitor C1' (that is, a lower limit of an output voltage in the operating interval I). Similarly, when the bus capacitor C2' is connected, the output voltage of the MMC needs to be greater than or equal to a sum of the voltage between both ends of the bus capacitor C1' and the voltage between both ends of the bus capacitor C2' (that is, a lower limit of the output voltage in operating interval II). That is, it is assumed that, in an operating process of the MMC, at a moment t1 when the bus capacitor C1' is connected, a transient value Vin (t1) of the input voltage of Vin and a transient value Vout (t1) of the output voltage of Vout meet:

$\text{Vin}(t1)\geq=\text{BUS 2};$ $\text{Vout}(t1)\geq=\text{BUS 2}.$

Assuming that the bus capacitor C2' is connected at a moment t2, the transient value Vin (t2) of the input voltage of Vin and the transient value (t2) of the output voltage of Vout meet:

$\text{Vin}(t2)\geq=\text{BUS 2}+\text{BUS 3};$ $\text{Vout}(t2)\geq=\text{BUS 2}+\text{BUS 3}.$ In other words, before any other bus capacitor Ci' (in this case, i may be an integer greater than 2) in the common conversion module is connected, the voltage between both ends of the bus capacitor C and the voltage between both ends of each bus capacitor in the common conversion module may be detected. The bus capacitor Ci' is connected at a moment t1 when the output voltage of Vout is greater than or equal to the sum of the voltage between both ends of the bus capacitor in the common conversion module. Herein, the sum of the voltage between both ends of the bus capacitor in the common conversion module is a sum of voltages between both ends of the bus capacitors that are connected to the common conversion module and the voltage between both ends of the bus capacitor Ci'. It can be learned that, before any other bus capacitor Ci' in the common conversion module is connected, the voltage between both ends of the bus capacitor C and the voltage between both ends of each bus capacitor in the common conversion module may be detected. The bus capacitor Ci' is connected at a moment t1 when both the output voltage of Vin and the output voltage of Vout are greater than or equal to the sum of the voltages between both ends of the bus capacitors in the common conversion module, so as to ensure properness of the output voltage of the MMC and prevent the current of the input loop of the MMC from flowing back to Vin. Herein, the sum of the voltages between both ends of the bus capacitors in the common conversion module is a sum of voltages between both ends of the bus capacitors that are connected to the common conversion module and the voltage between both ends of the bus capacitor Ci'. That is, it is assumed that, in an operating process of the MMC, at a moment t1 when the bus capacitor Ci' is connected, a transient value Vin (t1) of the input voltage of Vin and a transient value Vout (t1) of the output voltage of Vout meet:

$\text{Vin}(t1)\geq=\text{BUS 2}+\ldots+\text{BUSi};$ $\text{Vout}(t2)\geq=\text{BUS 2}+\ldots+\text{BUSi}.$ BUS 2+ . . . +BUSi−1 are the voltages at both ends of the bus voltages that are connected to the output loop of the MMC, where BUSi is a target voltage of the voltage at both ends of the bus capacitor Ci'.

In some feasible implementations, as shown in FIG. 3, the MMC provided in this embodiment of this application may further include a switch apparatus K and an inductor; and the first input/output end 11 of the input conversion module is connected to the first input/output end of Vin through the switch apparatus K and the inductor. Herein, the switch apparatus may be configured to: when an input voltage of Vin suddenly changes or is abnormal, ensure single-phase flow of a current in the MMC, ensure stability of the circuit of the MMC, and improve applicability. Optionally, the switch apparatus k include two anti-parallel connected thyristors, and may be driven by a positive half cycle or a negative half cycle with an input of a sine wave voltage, so as to further ensure operating stability of the circuit of the MMC.

Figure 7:
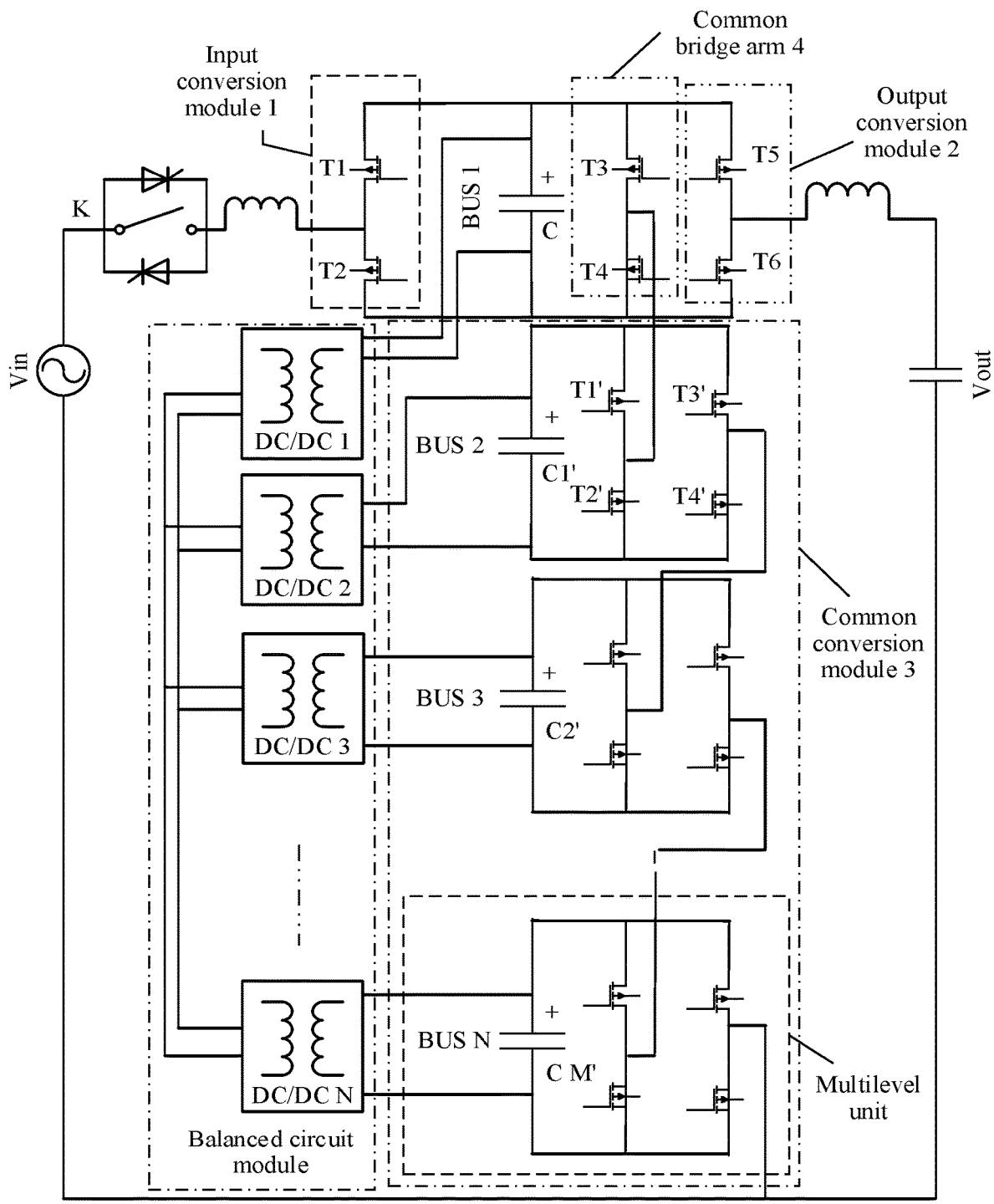
FIG. 7 is another schematic diagram of a structure of an MMC according to an embodiment of this application.

A balance control method of the output voltage of each functional module in the MMC is as follows:

In some feasible implementations, in the circuit shown in FIG. 3, the MMC provided in this embodiment of this application may further include a balanced circuit module. The balanced circuit module includes a plurality of DC/DC converters with one ends connected in parallel. Herein, the other end of one of the plurality of DC/DC converters is connected in parallel to one bus capacitor in the MMC. The balanced circuit module is configured to adjust a voltage between both ends of each bus capacitor to a target voltage by using the DC/DC converter connected to each bus capacitor, to balance the voltage between both ends of each bus capacitor. FIG. 7 is another schematic diagram of a structure of an MMC according to an embodiment of this application. As shown in FIG. 7, the MMC provided in this embodiment of this application further includes a balanced circuit module. The balanced circuit module includes a plurality of DC/DC converters, such as a DC/DC 1, a DC/DC 2, . . . , and a DC/DC N. One ends of the DC/DC 1, the DC/DC 2, . . . , and the DC/DC N are connected in parallel. The other end of the DC/DC 1 is connected in parallel to a first bus capacitor (namely, a bus capacitor C), the other end of the DC/DC 2 is connected in parallel to a bus capacitor (for example, a bus capacitor C1') of a first multilevel unit (for example, a multilevel unit 1) of the common conversion module, the other end of the DC/DC 3 is connected in parallel to a bus capacitor (for example, a bus capacitor C2') of a second multilevel unit (for example, a multilevel unit 2) in the common conversion module, . . . , and the other end of the DC/DC N is connected in parallel to a bus capacitor (for example, a bus capacitor C M') of an Nth multilevel unit (for example, a multilevel unit N) in the common conversion module.

Figure 8:
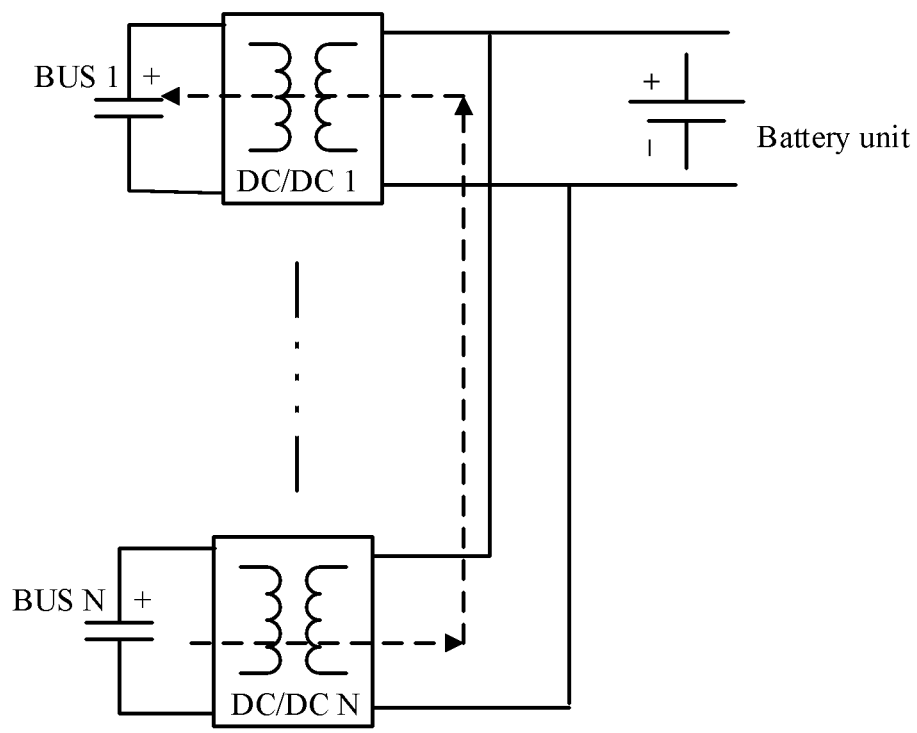
FIG. 8 is a schematic diagram of a structure of a balanced circuit module according to an embodiment of this application.
Figure 9:
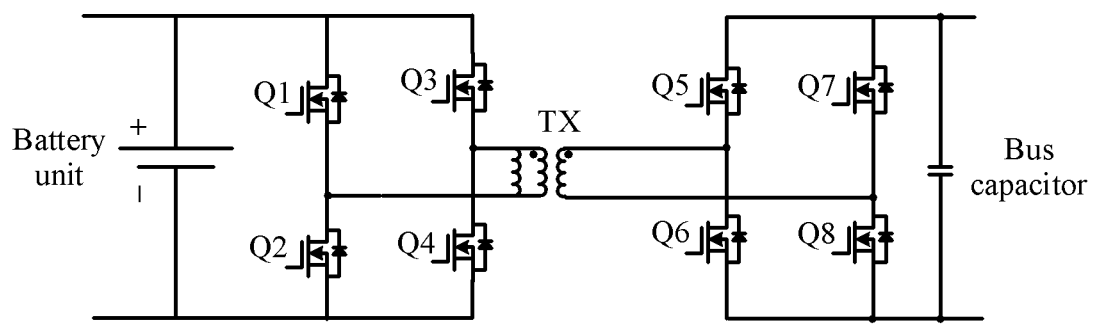
FIG. 9 is a schematic diagram of a structure of a DC/DC converter according to an embodiment of this application.

Optionally, in some feasible implementations, refer to FIG. 8. FIG. 8 is a schematic diagram of a structure of a balanced circuit module according to an embodiment of this application. The balanced circuit module may further include a battery unit, and a plurality of DC/DC converters in the balanced circuit module are connected in parallel to both ends of the battery unit. Herein, the battery unit may be a battery that is in the UPS and that is configured to provide an input for the MMC when an input of the main input end (namely, Vin) of the UPS is abnormal, or may be another battery connected in series to the battery. This may be specifically determined based on an actual application scenario, and is not limited herein. BUS 1 to BUS N represent the voltages between both ends of the bus capacitors in the MMC. FIG. 9 is a schematic diagram of a structure of a DC/DC converter according to an embodiment of this application. As shown in FIG. 9, each DC/DC converter in the balanced circuit module may be a bidirectional DC/DC converter, and a circuit topology of the bidirectional DC/DC converter is an isolated circuit topology. In other words, each DC/DC converter in the foregoing balanced circuit module may be a bidirectional isolated converter, where Q1, Q2, . . . , and Q8 are power switching transistors of the DC/DC converter, Q1, Q2, . . . , and Q8 are all power switching transistors with anti-parallel connected diodes, and TX is a transformer.

Figure 10:
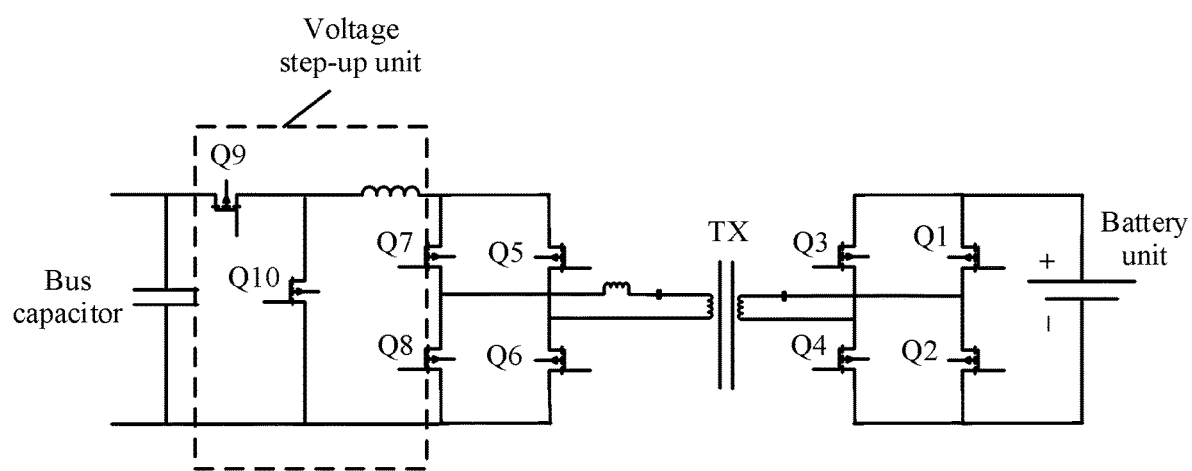
FIG. 10 is another schematic diagram of a structure of a balanced circuit according to an embodiment of this application.

FIG. 10 is another schematic diagram of a structure of a balanced circuit according to an embodiment of this application.

Optionally, in some feasible implementations, one DC/DC converter in the foregoing balanced circuit module may be connected in parallel to one bus capacitor in the MMC through one voltage step-up unit. Herein, the voltage step-up unit may include a first switching transistor (for example, Q9), a second switching transistor (for example, Q10), and an inductor. Q9 and Q10 are connected in series, and then are connected in parallel to both ends of the bus capacitor, and a series connection point between Q9 and Q10 is connected to the DC/DC converter through the inductor. In a circuit shown in FIG. 10, in a discharging process, a battery unit supplies energy to a bus capacitor, that is, the battery unit charges the bus capacitor. In this case, both Q2 and Q3 turn on, the energy is transferred to a secondary side through a transformer TX, and Q5, Q6, Q7, and Q8 do not act. In this case, the anti-parallel connected diodes in Q5, Q6, Q7, and Q8 are used to perform rectification, and the inductor L, Q9, and Q10 are used to adjust the voltage at both ends of the bus voltage. After Q2 and Q3 turn on, Q1 and Q4 turn on after a dead time. The energy is also transferred to the secondary side through the transformer TX, and Q5, Q6, Q7, and Q8 do not act. In this case, the anti-parallel connected diodes in Q5, Q6, Q7, and Q8 are used to perform rectification, and the inductor L and Q9, and Q10 are used to perform voltage adjustment, so as to control the voltage at both ends of the bus capacitor to be a target voltage. In a charging process, energy is transferred from the bus capacitor to the battery unit, that is, the battery unit is charged by using the bus capacitor. A control process of each power switching transistor is similar to the foregoing discharging process, and is not limited herein. In addition, in the circuit structure shown in FIG. 10, the capacitor and the inductor that are connected in series to the transformer TX may form a series resonant circuit, to form resonance and reduce a switching loss.

In some feasible implementations, each DC/DC converter in the foregoing balanced circuit may detect a voltage between both ends of each bus capacitor in the MMC, and adjust, based on the voltage between both ends of each bus capacitor and the target voltage of each bus capacitor, the voltage between both ends of each bus capacitor to the target voltage by controlling the switching transistors in the DC/DC converter connected to each bus capacitor to turn on or off; that is, the voltage between both ends of each bus capacitor may be adjusted to the target voltage by using the DC/DC converter connected to each bus capacitor. When the voltage between both ends of any bus capacitor in the MMC is less than the target voltage of the bus capacitor, and the voltage between both ends of at least one another bus capacitor other than the bus capacitor in the MMC is greater than the target voltage of the another bus capacitor, the switching transistors in the DC/DC converters that are connected to the bus capacitor and the another bus capacitor are controlled to turn on or off, so that the another bus capacitor charges the bus capacitor. For example, in the circuit of the MMC shown in FIG. 7, when the voltage between both ends of any bus capacitor (for example, the bus capacitor C) in the MMC is less than the target voltage (for example, BUS 1) of the bus capacitor C, and the voltage between both ends of at least one another bus capacitor (for example, the bus capacitor Ci') other than the bus capacitor C in the MMC is greater than the target voltage (for example, BUS 2) of the bus capacitor Ci', the switching transistors in the DC/DC converters (for example, DC/DC 1 and DC/DC 2) that are connected to the bus capacitor C and the bus capacitor Ci' may be controlled to turn on or off, so that the bus capacitor Ci' charges the bus capacitor C. In this case, the bus capacitor Ci' may be equivalent to the battery unit shown in FIG. 10, and the bus capacitor C may be equivalent to the bus capacitor shown in FIG. 10.

Similarly, when the voltage between both ends of any bus capacitor in the MMC is greater than the target voltage of the bus capacitor, and the voltage between both ends of at least one another bus capacitor other than the bus capacitor in the MMC is less than the target voltage of the another bus capacitor, the switching transistors in the DC/DC converters that are connected to the bus capacitor and the another bus capacitor are controlled to turn on or off, so that the bus capacitor charges the another bus capacitor. For example, when the voltage between both ends of the bus capacitor Ci' is less than BUS 2, and the voltage between both ends of the bus capacitor C is greater than BUS 1, the switching transistors in the DC/DC converters (for example, DC/DC 1 and DC/DC 2) that are connected to the bus capacitor C and the bus capacitor Ci' may be controlled to turn on or off, so that the bus capacitor C charges the bus capacitor Ci'. In this case, the bus capacitor Ci' may be equivalent to the bus voltage shown in FIG. 10, and the bus capacitor C may be equivalent to the battery unit shown in FIG. 10.

Optionally, in some feasible implementations, if the DC/DC converters in the balanced circuit are connected in parallel to both ends of the battery unit, when the voltage between both ends of any bus capacitor in the MMC is less than the target voltage of the bus capacitor, the switching transistors in the DC/DC converter connected to the bus capacitor may be controlled to turn on or off, so that the battery unit charges the bus capacitor. When the voltage between both ends of the bus capacitor is greater than the target voltage, the switching transistors in the DC/DC converter connected to the bus capacitor may be controlled to turn on or off, so that the bus capacitor discharges to the battery unit. In this case, the balanced module of the MMC may act as a charger to charge a battery in the UPS, and no additional charger is needed in the UPS, so that a quantity of circuit devices in the UPS may be reduced, thereby improving circuit stability of the UPS and improving adaptability.

In this embodiment of this application, the balanced module in the MMC may adjust the voltage between both ends of each bus capacitor in the MMC. This ensures that output voltages of the bus capacitors are balanced, and also ensures that an output voltage of the MMC is proper and stable. Operations are flexible, and applicability is higher.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A modular multilevel converter (MMC) comprising:
   an input converter comprising:
      a first input converter input/output (I/O) end; and
      a second input converter I/O end;
   an output converter comprising:
      a first output converter I/O end; and
      a second output converter I/O end;
   a voltage input (Vin) comprising:
      a first Vin I/O end connected to the first input converter I/O end; and
      a second Vin I/O end;
   a voltage output (Vout) comprising:
      a first Vout I/O end; and
      a second Vout I/O end connected to the second output converter I/O end;
   a common converter comprising:
      a first common converter I/O end;
      a second common converter I/O end connected to the second Vin I/O end and the first Vout I/O end; and
      at least one multilevel unit connected in series, wherein each of the at least one multilevel unit comprises a bus capacitor;
   a common bridge arm comprising a common bridge I/O end configured to:
      connect the first output converter I/O end to the first common converter I/O end; and
      connect the first common converter I/O end to the second input converter I/O end, wherein the input converter and the output converter share the bus capacitor; and
   a balanced circuit comprising a plurality of direct current to direct current (DC/DC) converters,
   wherein the plurality of DC/DC converters comprise DC/DC input ends and DC/DC output ends,
   wherein the DC/DC input ends are connected in parallel to each other,
   wherein the DC/DC output ends are connected to the bus capacitors,
   wherein the balanced circuit is configured to adjust, using the plurality of DC/DC converters, a voltage across each bus capacitor to a target voltage in order to balance voltages across each bus capacitor of the at least one multilevel unit.

2. The modular multilevel converter of claim 1, further comprising a voltage step-up unit configured to connect in parallel one DC/DC converter in the balanced circuit to the bus capacitor in the MMC, wherein the voltage step-up unit comprises:
   a first switching transistor,
   a second switching transistor connected in series with the first switching transistor, wherein the first switching transistor and the second switching transistor are connected in parallel to both ends of the bus capacitor; and
   an inductor coupled to a series connection point between the first switching transistor and the second switching transistor to the DC/DC converter.

3. The modular multilevel converter of claim 2, wherein the balanced circuit further comprises a battery unit having two ends, and wherein each DC/DC output end of the plurality of DC/DC converters is connected in parallel to the two ends of the battery unit.

4. The modular multilevel converter of claim 3, wherein the DC/DC converter is a bidirectional DC/DC converter, and wherein a circuit topology of the bidirectional DC/DC converter is an isolated circuit topology.

5. The modular multilevel converter of claim 1, wherein the MMC further comprises a switch apparatus configured to connect the first input converter I/O end to the first Vin I/O.

6. The modular multilevel converter of claim 1, wherein the MMC comprises power switching transistors T1, T2, T3, T4, T5 and T6 each having a first connection end and a second connection end, wherein the bus capacitor comprises a positive electrode and a negative electrode, wherein the power switching transistors T1, T2 and the bus capacitor form the input converter, wherein the power switching transistors T5, T6 and the bus capacitor form the output convert, wherein the power switching transistors T3 and T4 form the common bridge arm, wherein the first connection end of T1 is connected to the second connection end of T2 and configured as the first input converter I/O end, wherein the first connection end of T3 is connected to the second connection end of T4 and configured as the common bridge I/O end, wherein the first connection end of T5 is connected to the second connection end of T6 and configured as the second output converter I/O end, wherein the second connection end of T1 is connected to the positive electrode of the bus capacitor, the second connection end of T3, and the second connection end of T5, and wherein the first connection end of T2 is connected to the negative electrode of the bus capacitor, the first connection end of T4, and the second connection end of T6.

7. The modular multilevel converter of claim 1, wherein the multilevel unit is a full-bridge circuit comprising:
power switching transistors T1', T2', T3', and T4' each having a first connection end and a second connection end;
a first full-bridge I/O end; and
a second full-bridge I/O end,
wherein the bus capacitor comprises a positive electrode and a negative electrode,
wherein the first connection end of T1' is connected to the second connection end of T2' and configured as the first full-bridge I/O end,
wherein the first connection end of T3' is connected to the second connection end of T4' and configured as the second full-bridge I/O end,
wherein the second connection end of T1' is connected to the positive electrode of the bus capacitor and the second connection end of T3', and
wherein the first connection end of T2' is connected to the negative electrode of the bus capacitor and the first connection end of T4'.

8. A control method applicable to a modular multilevel converter (MMC) and comprising:
detecting a voltage across each bus capacitor in the MMC; and
controlling, using a direct current to direct current (DC/DC) converter and based on the voltage across each bus capacitor and a target voltage of each bus capacitor, each switching transistor in the DC/DC converter connected to each bus capacitor in order to adjust the voltage across each bus capacitor to the target voltage.

9. The control method of claim 8, wherein controlling each switching transistor in the DC/DC converter connected to each bus capacitor comprises controlling, when a voltage across a first bus capacitor in the MMC is less than a target voltage of the first bus capacitor and a voltage across a second bus capacitor is greater than a target voltage of the second bus capacitor, switching transistors in DC/DC converters that are connected to the first bus capacitor and the second bus capacitor to turn on or off such that the second bus capacitor charges the first bus capacitor.

10. The control method of claim 8, wherein a balanced circuit of the MMC comprises a battery unit having two ends, wherein each output end of a plurality of DC/DC converters are connected in parallel to the two ends of the battery unit, and wherein controlling each switching transistor in the DC/DC converter connected to each bus capacitor comprises controlling, when a voltage across a first bus capacitor in the MMC is less than a target voltage of the first bus capacitor, switching transistors in a DC/DC converter connected to the first bus capacitor to turn on or off such that the battery unit charges the first bus capacitor.

11. The control method of claim 8, wherein the MMC comprises an input converter and an output converter sharing a first bus capacitor, and wherein the control method further comprises:
detecting a voltage across the first bus capacitor and a voltage across each bus capacitor of a plurality of bus capacitors, wherein the MMC comprises a common converter having a plurality of multilevel units, wherein each multilevel unit of the plurality of multilevel units comprises a bus capacitor of the plurality of bus capacitors; and
connecting a bus capacitor of the plurality of bus capacitors at a moment ti when an input voltage of a voltage input (Vin) of the MMC and an output voltage of a voltage output (Vout) of the MMC are greater than or equal to a sum of voltages across the plurality of bus capacitors in the common converter.

12. The control method of claim 8, wherein controlling each switching transistor in the DC/DC converter connected to each bus capacitor comprises, when a voltage across a first bus capacitor in the MMC is greater than a target voltage of the first bus capacitor, and a voltage across a second bus capacitor in the MMC is less than a target voltage of the second bus capacitor, controlling switching transistors in DC/DC converters that are connected to the first bus capacitor and the second bus capacitor to turn on or off such that the first bus capacitor discharges to the second bus capacitor.

13. The control method of claim 8, wherein a balanced circuit of the MMC comprises a battery unit having two ends, wherein each output end of a plurality of DC/DC converters are connected in parallel to the two ends of the battery unit, and wherein controlling each switching transistor in the DC/DC converter connected to each bus capacitor comprises, when a voltage across a first bus capacitor in the MMC is greater than a target voltage of the first bus capacitor, controlling switching transistors in a DC/DC converter connected to the first bus capacitor to turn on or off such that the first bus capacitor discharges to the battery unit.

14. A control method applicable to a modular multilevel converter (MMC) and comprising:
connecting a first bus capacitor to a voltage input (Vin) of the MMC;
bypassing each bus capacitor of a plurality of bus capacitors, wherein the MMC comprises a common converter having a plurality of multilevel units, wherein each multilevel unit of the plurality of multilevel units comprises a bus capacitor of the plurality of bus capacitors;
detecting a voltage across the first bus capacitor and a voltage across each bus capacitor in the common converter; and
connecting a bus capacitor of the plurality of bus capacitors at a moment ti when an input voltage of the voltage input (Vin) of the MMC and an output voltage of a voltage output (Vout) of the MMC are greater than or equal to a sum of voltages across the plurality of bus capacitors in the common converter.

15. An uninterruptible power supply (UPS) comprising:
a main input end Vin;
a modular multilevel converter (MMC);
a battery configured to:
provide, when an input of the main input end Vin is abnormal, an input power for the MMC; and
supply, when the input of the main input end Vin is abnormal, output power through the MMC; and
a static transfer switch (STS) configured to provide a backup power supply channel for the UPS when the output power of the MMC is abnormal;
MMC comprises:
an input converter, comprising:
a first input converter input/output (I/O) end; and
a second input converter I/O end;
a voltage input (Vin) comprising:
a first Vin I/O end connected to the first input converter I/O end; and
a second Vin I/O end;
a voltage output (Vout) comprising:
a first Vout I/O end; and
a second Vout I/O end connected to the second output converter I/O end;

an output converter comprising:
    a first output converter I/O end; and
    a second output converter I/O end;
a common converter comprising:
    a first common converter I/O end;
    a second common converter I/O end connected to the second Vin I/O end and the first Vout I/O end; and
    at least one multilevel unit connected in series, wherein each of the at least one multilevel unit comprises a bus capacitor;
a common bridge arm comprising a common bridge I/O end configured to:
    connect the first output converter I/O end to the first common converter I/O end; and
    connect the first common converter I/O end to the second input converter I/O end, wherein the input converter and the output converter share the bus capacitor; and
a balanced circuit comprising a plurality of direct current to direct current (DC/DC) converters,
wherein the plurality of DC/DC converters comprise DC/DC input ends and DC/DC output ends, wherein the DC/DC input ends are connected in parallel to each other,
wherein the DC/DC output ends are connected to the bus capacitors, and
wherein the balanced circuit is configured to adjust, using the plurality of DC/DC converters, a voltage across each bus capacitor to a target voltage in order to balance voltages across each bus capacitor of the at least one multilevel unit.

16. The uninterruptible power supply of claim 15, wherein the balanced circuit comprises a battery unit connected in series to the battery.

17. The uninterruptible power supply of claim 16, wherein the DC/DC converter is a bidirectional DC/DC converter, and wherein a circuit topology of the bidirectional DC/DC converter is an isolated circuit topology.

18. The uninterruptible power supply of claim 15, wherein the MMC further comprises a switch apparatus configured to connect the first input converter I/O end to the first Vin I/O end.

19. The uninterruptible power supply of claim 15, wherein the MMC comprises power switching transistors T1, T2, T3, T4, T5 and T6 each having a first connection end and a second connection end, wherein the bus capacitor comprises a positive electrode and a negative electrode, wherein the power switching transistors T1, T2 and the bus capacitor form the input converter, wherein the power switching transistors T5, T6 and the bus capacitor form the output converter, wherein the power switching transistors T3 and T4 form the common bridge arm, wherein the first connection end of T1 is connected to the second connection end of T2 and configured as the first input converter I/O end, wherein the first connection end of T3 is connected to the second connection end of T4 and configured as the common bridge I/O end, wherein the first connection end of T5 is connected to the second connection end of T6 and configured as the second output converter I/O end, wherein the second connection end of T1 is connected to the positive electrode of the bus capacitor, the second connection end of T3, and the second connection end of T5, and wherein the first connection end of T2 is connected to the negative electrode of the bus capacitor, the first connection end of T4, and the second connection end of T6.

20. The uninterruptible power supply of claim 15, wherein the multilevel unit is a full-bridge circuit comprising:
    power switching transistors T1', T2', T3', and T4' each having a first connection end and a second connection end;
    a first full-bridge I/O end; and
    a second full-bridge I/O end,
    wherein the bus capacitor comprises a positive electrode and a negative electrode,
    wherein the first connection end of T1' is connected to the second connection end of T2' and configured as the first full-bridge I/O end,
    wherein the first connection end of T3' is connected to the second connection end of T4' and configured as the second full-bridge I/O end,
    wherein the second connection end of T1' is connected to the positive electrode of the bus capacitor and the second connection end of T3', and
    wherein the first connection end of T2' is connected to the negative electrode of the bus capacitor and the first connection end of T4'.

* * * * *

UNITED STATES PATENT AND TRADEMARK OFFICE
CERTIFICATE OF CORRECTION

PATENT NO. : 12,308,760 B2  
APPLICATION NO. : 18/325638  
DATED : May 20, 2025  
INVENTOR(S) : Zhengdong Jiang, Chuntao Zhang and Maoyong Lu Page 1 of 1

It is certified that error appears in the above-identified patent and that said Letters Patent is hereby corrected as shown below:

In the Claims

Claim 15, Column 22, Line 56: "MMC comprises:" should read "wherein the MMC comprises:"

Signed and Sealed this  
Twenty-fourth Day of June, 2025

Coke Morgan Stewart  
*Acting Director of the United States Patent and Trademark Office*